(12) United States Patent
Lee

(10) Patent No.: US 8,982,092 B2
(45) Date of Patent: Mar. 17, 2015

(54) TOUCH CELL STRUCTURE FOR A TOUCH PANEL, TOUCH PANEL USING SAME, AND TOUCH INPUT DETECTION METHOD

(76) Inventor: Sung Ho Lee, Hwaseong-si (KR)

(*) Notice: Subject to any disclaimer, the term of this patent is extended or adjusted under 35 U.S.C. 154(b) by 125 days.

(21) Appl. No.: 13/518,835

(22) PCT Filed: Dec. 23, 2010

(86) PCT No.: PCT/KR2010/009243
§ 371 (c)(1),
(2), (4) Date: Jun. 22, 2012

(87) PCT Pub. No.: WO2011/078591
PCT Pub. Date: Jun. 30, 2011

(65) Prior Publication Data
US 2012/0262418 A1    Oct. 18, 2012

(30) Foreign Application Priority Data
Dec. 24, 2009 (KR) .................. 10-2009-0130696

(51) Int. Cl.
G06F 3/045 (2006.01)
G06F 3/041 (2006.01)
G06F 3/044 (2006.01)

(52) U.S. Cl.
CPC ...... *G06F 3/044* (2013.01); *G06F 2203/04112* (2013.01)
USPC .......................................... 345/174; 345/173

(58) Field of Classification Search
CPC ..... H03K 17/962; H03K 17/955; G01D 5/24; G06F 3/03547; G06F 3/041; G06F 3/0416; G06F 3/0488; G06F 2203/04105
USPC ................................. 345/173, 174
See application file for complete search history.

(56) References Cited

U.S. PATENT DOCUMENTS

| | | | |
|---|---|---|---|
| 2005/0179668 A1* | 8/2005 | Edwards ..................... | 345/173 |
| 2008/0007529 A1* | 1/2008 | Paun et al. ................. | 345/168 |
| 2009/0115756 A1* | 5/2009 | Krusos et al. .............. | 345/207 |
| 2010/0123675 A1* | 5/2010 | Ippel .......................... | 345/173 |
| 2010/0207902 A1* | 8/2010 | Juan et al. ................. | 345/173 |
| 2011/0115733 A1* | 5/2011 | Shih .......................... | 345/173 |

FOREIGN PATENT DOCUMENTS

| | | |
|---|---|---|
| KR | 10-2007-0016683 A | 2/2007 |
| KR | 10-2008-0075339 A | 8/2008 |
| KR | 10-2009-0000484 A | 1/2009 |
| KR | 10-0909265 B1 | 7/2009 |

* cited by examiner

*Primary Examiner* — Aneeta Yodichkas
(74) *Attorney, Agent, or Firm* — Kile Park Reed & Houtteman PLLC

(57) ABSTRACT

Provided is a touch cell structure having high detection sensitivity and accuracy, a touch panel using the same, and a touch input detection method. According to technical advantages, an electrostatic capacitance Ct formed between a touch unit and a conductive pad at the time of occurrence of a touch input is an important factor that determines a kick back, to thus make a great difference between output signals from a switching device due to a kick back difference depending upon whether or not a touch input exists. Thus, detection sensitivity and detection accuracy with respect to the touch input are very high, the touch input is not little influenced due to external noise, and the output signal in an analog form from the switching device is detected in a digital mode without being converted into a digital signal in an analog to digital (ADC) converter.

14 Claims, 10 Drawing Sheets

| R10 | RST3 | RST2 | RST1 | RST0 | Input3 | Input2 | Input1 | Input0 |
|---|---|---|---|---|---|---|---|---|
| 10h | 1 | 1 | 0 | 0 | 0 | 0 | 1 | 1 |

| INPUT3 | INPUT2 | INPUT1 | INPUT0 | |
|---|---|---|---|---|
| L | L | L | L | 100us |
| L | L | L | H | 110us |
| L | L | H | L | 120us |
| L | L | H | H | 130us |
| .. | .. | .. | .. | .. |
| H | H | H | L | 240us |
| H | H | H | H | 250us |

TOUCH CELL STRUCTURE FOR A TOUCH PANEL, TOUCH PANEL USING SAME, AND TOUCH INPUT DETECTION METHOD

TECHNICAL FIELD

The invention relates to a touch cell structure for a touch panel, touch panel using same, and touch input detection method, and more particularly, to a touch cell structure for a touch panel of a new structure that heightens detection sensitivity and accuracy for a touch input, greatly reduce a reaction time, and does not nearly cause malfunction due to noise, and a touch panel using the same, and a touch input detection method.

BACKGROUND ART

Usually, touch panels are input devices which are respectively attached onto display devices such as LCDs (Liquid Crystal Displays), PDPs (Plasma Display Panels), OLED (Organic Light Emitting Diode) displays, and AMOLED (Active Matrix Organic Light Emitting Diode) displays or which are respectively built in the display devices, to thus generate an input signal corresponding to a position where a touch input occurs using a touch unit such as a finger or a touch pen.

The touch panels are chiefly mounted respectively on mobile devices such as mobile phones, PDAs (Personal Digital Assistants) or PMPs (Portable Multimedia Players). Besides, touch input devices are being used over all industries such as navigation terminals, netbook computers, notebook computers, DIDs (Digital Information Devices), desktop computers that use touch input supporting operating systems, IPTVs (Internet Protocol TVs), the most advanced fighter aircrafts, tanks, and armored vehicles.

Various types of conventional touch panels are disclosed, but resistive-type touch input devices having simple manufacturing processes and inexpensive manufacturing costs have been used most widely. The resistive-type touch panels, however, have low transmittance and undergo the pressure applied to respective substrates, to thereby cause problems that inevitable loss of durability occurs over lapse of use time, malfunction or misrecognition frequently takes place due to changes in resistance values depending upon the external environment, and uniformity of surface resistance is strictly needed to thus cause a very poor yield. It is also difficult to apply the resistive-type touch panels for a large screen display, and it is fundamentally difficult to recognize multiple touches.

Capacitive-type or electrostatic capacitive-type touch panels that were developed as an alternative to the resistive-type touch panels detect touch inputs in a non-contact mode and have a solution to various problems of the resistive-type touch panels.

FIG. 1 shows the structure of a conventional electrostatic capacitive-type touch panel. Referring to FIG. 1, the conventional capacitive-type touch panel includes transparent conductive films that are formed on the top and bottom surfaces of a transparent substrate 10 made of film, plastic or glass. Metal terminals 12 for applying voltage are formed at each of four corners of the transparent substrate 10. The transparent conductive film is formed of transparent metal such as ITO (Indium Tin Oxide) or ATO (Antimony Tin Oxide). The metal terminals 12 respectively formed at the four corners of the transparent conductive film are formed by printing low resistivity conductive metal such as silver (Ag). A resistor network is formed around the metal terminals 12. The resistor network is formed in a linearization pattern in order to transmit a control signal equally on the entire surface of the transparent conductive film. A protective film is coated on top of the transparent conductive film including the metal terminals 12.

The capacitive-type touch panels operate as follows. A high-frequency alternating-current (AC) voltage applied to the metal terminals 12, is spread to the whole surface of the transparent substrate 10. Here, if a finger 16 (or a conductive material touch unit) lightly touches the top surface of a transparent conductive film of the transparent substrate 10, a certain amount of electric current is absorbed into the human body and changes in the electric current are detected by a built-in electric current sensor of a controller 14, to thus calculate the amount of electric current at the four metal terminals 12, respectively, and to thereby recognize a touch point.

The capacitive-type touch panel employs a soft touch mode to thus have a long life, uses only a sheet of the transparent substrate 10, to thus have a high light transmittance, and makes a special metal coating treatment on a contact surface thereof, to thus have an advantage of robustness. In particular, the capacitive-type touch panel has a narrow width of a non-active area which makes it impossible to detect touch inputs at the panel edge portions, to thus have an advantage of enabling a mechanical instrument to be made in a slim form at the time of being coupled with a display device.

However, the electrostatic capacitive-type touch panel needs an expensive detector in order to detect a magnitude of minute electric current, and further needs an analog-to-digital (ADC) converter for converting detected analog electric current to digital electric current, to accordingly cause an inevitable price increase. In addition, there may raise a problem that a response time is prolonged due to the time consumed for converting analog signals to digital signals. Above all, since a difference in magnitude between an electric current detected when a touch input occurs and a usual electric current measured before the touch input is very small, there may cause had detection sensitivity and high noise sensitivity. For example, assuming that a magnitude of electric current that is leaked from one of the metal terminals 12 when no touch input occurs is 1 μA and a magnitude of electric current that is leaked from the same one metal terminal 12 when a touch input occurs is 2 μA, detection of the difference between the minute electric currents by using a circuitry means may cause degradation of accuracy and signal recognition errors due to noise.

DISCLOSURE

Technical Problem

In order to solve the above-mentioned problems of causing poor detection accuracy and weakness to noise due to a minute change in electric current values before and after a touch input takes place in a conventional electrostatic capacitive-touch input device, it is an object of the present invention to provide a touch cell structure for a touch panel enlarging a difference between detection signals depending upon when no touch input exists and when a touch input exists, by using a kick back phenomenon, to thus heighten detection sensitivity and accuracy for touch inputs, to thus greatly reduce a response time, and to thus undergo little influence due to noise, and a touch panel using the same, and a touch input detection method.

Technical Solution

To attain the above object of the present invention, according to an aspect of the present invention, there is provided a touch cell structure constituting a unit touch cell 60 in a touch panel, the touch cell structure comprising:

a conductive pad 50 that forms an electrostatic capacitance "Ct" with respect to a touch unit when a finger 25 of a human body or the touch unit having an electrical characteristic similar to the finger approaches the conductive pad 50 within a predetermined distance "d";

a three-terminal type switching device 40 whose input or output terminals are connected with the conductive pad 50 and that is controlled to be turned on/off by a control signal that is applied to a gate terminal of the three-terminal type switching device 40, to this charge or discharge the electrostatic capacitance "Ct" formed between the touch unit and the conductive pad 50; and a capacitor C1 that is connected between the control terminal of the switching device 40 and the conductive pad 50.

Preferably but not necessarily, the touch cell structure further comprises a capacitor C2 that is connected between the conductive pad 50 and the ground.

Preferably but not necessarily, the capacitors C1 and C2 are in the range of 10 fF to 300 uF, respectively.

Preferably but not necessarily, the capacitors C1 and C2 are selected to have a smaller value by twice to several hundreds of times than the electrostatic capacitance "Ct" formed between the touch unit and the conductive pad 50.

Preferably but not necessarily, the switching device 40 is any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch.

Preferably but not necessarily, the capacitor C1 is built in the switching device 40.

Preferably but not necessarily, the capacitor C1 is provided in the outside of the switching device 40.

Preferably but not necessarily, the capacitor C1 is built in the switching device 40, and simultaneously another capacitor C1 is provided in the outside of the switching device 40.

To achieve the above object, according to another aspect of the present invention, there is also provided a touch panel comprising:

a light transmissive substrate 30;

a plurality of touch cells 60 that are arranged in a matrix form on the light transmissive substrate 30, in which each touch cell is configured to have a structure of any one of the above-described touch cells and comprises a conductive pad 50 and a three-terminal type switching device 40; and a touch position detector 70 that is provided at an edge portion of the substrate 30 or at an outside of the substrate 30, to thus apply a turn on/off control signal to a control terminal of the switching device 40, apply a charging signal to the conductive pad 50, and recognize a touch input considering a difference between output signals of the switching device 40 due to a kick back difference depending upon whether or not the touch input occurs.

Preferably but not necessarily, the touch panel further comprises a comparator for comparing the output signal of the switching device 40 and a reference signal.

Preferably but not necessarily, the reference signal corresponds to an intermediate value between the output signals from the switching device 40 at the time of occurrence of no touch inputs and at the time of occurrence of any touch inputs.

Preferably but not necessarily, the touch position detector further comprises a memory unit 74 having addresses corresponding to the coordinates of the touch cells, in which if a touch input is detected from the output signal of the switching device 40, coordinate values of the corresponding touch cell are stored in the corresponding addresses of the memory unit 74.

To achieve the above object, according to still another aspect of the present invention, there is also provided a touch input detection method of detecting a touch input by using a touch cell structure of the above-described touch cell structures, the touch input detection method comprising the steps of:

(a) detecting a signal output from an output terminal of a switching device 40 according to a kick back that occurs between the switching device 40 and a conductive pad 50 when no touch inputs occur;

(b) detecting a signal output from the output terminal of the switching device 40 according to a kick back that occurs between the switching device 40 and the conductive pad 50 when any touch inputs occur; and (c) recognizing a touch input from the signal detected in the step (b) by comparing the signal detected in the step (a) with the signal detected in the step (b).

Preferably but not necessarily, an intermediate value between the signal detected in the step (a) and the signal detected in the step (b) is set as a reference signal in the step (c), to then recognize the touch input if the signal output from the output terminal of the switching device 40 exceeds the reference signal.

Advantageous Effects

In a touch cell structure, a touch panel using the same, and a touch input detection method according to the present invention, a circuit constituting touch cells has a specialized circuit configuration. Accordingly, an electrostatic capacitance Ct formed between a touch unit and a conductive pad at the rime of occurrence of a touch input is an important factor that determines a kick back, to thus make a great difference between output signals from a switching device depending upon whether or not a touch input exists. Thus, detection sensitivity and detection accuracy with respect to the touch input are very high, the touch input is not little influenced due to external noise, and the output signal in an analog form from the switching device is detected in a digital mode without being converted into a digital signal in an analog to digital (ADC) converter, to thereby provide in effect of obtaining a simple circuit configuration and a very fast signal response.

DESCRIPTION OF DRAWINGS

The above and other objects and advantages of the invention will become more apparent by describing the preferred embodiments with reference to the accompanying drawings in which.

BEST MODE

Figure 1:
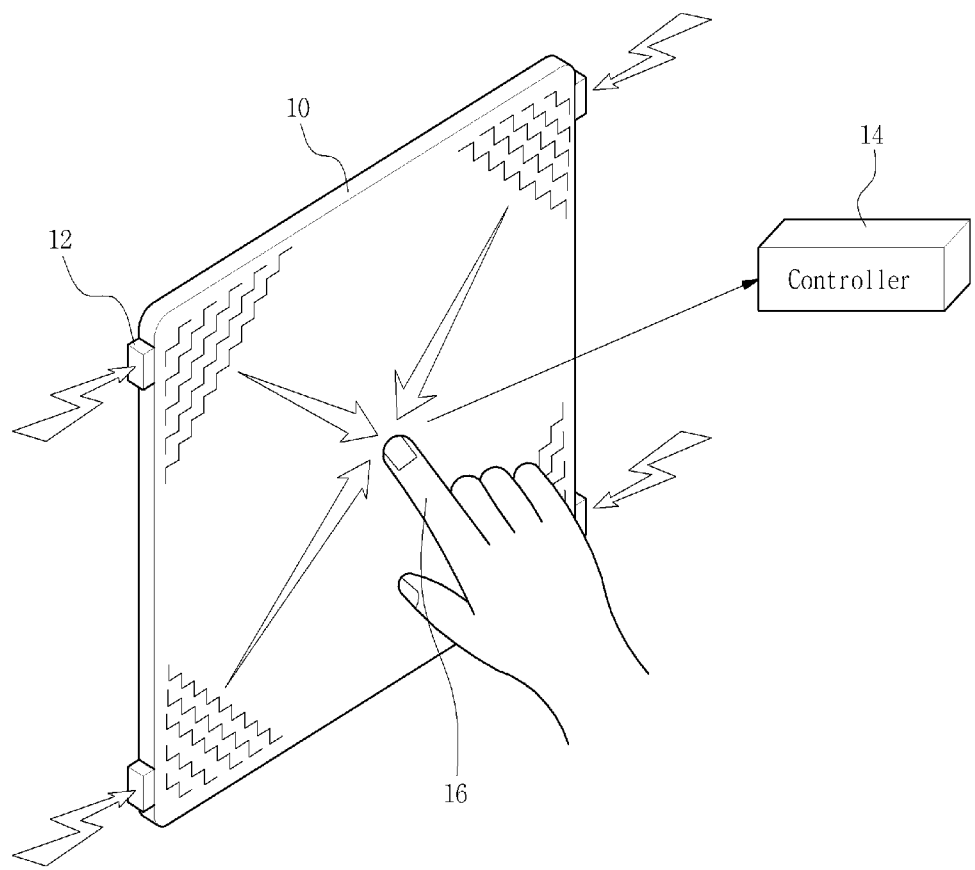
FIG. 1 is a perspective view showing an example of a conventional capacitive-type touch panel.

Hereinbelow, a touch cell structure, a touch panel using the same, and a touch input detection method according to respectively preferred embodiments of the present invention will be described with reference to the accompanying drawings.

First, the present invention relates to a touch cell structure for a capacitive-type (or called an electrostatic capacitive-type) touch panel that is added on an upper surface of a display device such as LCD (Liquid Crystal Display), PDP (Plasma Display Panel), OLED (Organic Light Emitting Diode), and AMOLED (Active Matrix Organic Light Emitting Diode), or that is built in the display device, and that detects a contact or an approach of a human body or a touch unit having a conductive characteristic similar to that of the finger with respect to a conductive pad to thus acquire a touch signal. The touch cell structure according to the present invention means a structure of respective unit touch cells, in a cell type touch input device in which an active area that enables an actual touch input on a touch panel is divided into a plurality of sub-areas, and thus a plurality of touch cells are arranged in a matrix pattern.

The specialized touch cell structure according to the present invention includes: a conductive pad that forms an electrostatic capacitance relative to a finger or a touch unit having a conductive characteristic similar to that of the finger; a switching device that applies charging signal to the conductive pad and detects whether or not the touch unit approaches the conductive pad; and a capacitor that is connected between the switching device and the conductive pad to thus generate a kick back at the time of a turn-on/off operation of the switching device. In the above-described touch cell structure, an electrostatic capacitance formed between the touch unit and the conductive pad at the time of occurrence of a touch input acts as an important factor that determines a kick back between the switching device and the conductive pad. A great difference is made between output signals from a switching device depending upon whether or not a touch input exists, to thereby more easily detect a touch input.

The switching device constituting each touch cell is equipped with a three-terminal type configuration having a control terminal that can control a turn-on/off operation. For example, the three-terminal type switching device is a control device for controlling conduction of an input/output terminal in accordance with a control signal applied to the control terminal of the switching device, and may be any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch; an IGBT (insulated Gate Bipolar Transistor) switch, and a TFT (Thin Film Transistor) switch. The relay is a switching device that outputs a voltage or current applied to an input terminal thereof with no loss when a current is applied to a control terminal thereof. The BJT switch is a switching device that a certain amount of amplified current flows from the collector thereof to the emitter thereof when current flows to the base thereof at a state where a voltage higher than a threshold voltage of the base thereof is applied to the base thereof. In addition, the TFT switch is a switching device that is used in a pixel unit constituting a display device such as LCD or AMOLED, including a gate terminal as a control port, a drain terminal as an input port, and a source terminal as an output port, in which the TFT switch is conducted when a voltage above a threshold voltage larger than the voltage applied to the source terminal is applied to the gate terminal and a current dependent on a magnitude of the voltage applied to the gate terminal flows from the input terminal to the output port.

On the following description, an example of using the TFT as a switching device will be described, in which identical reference numerals are given to the switching device and the TFT. Switching a signal in each touch cell using the TFT is similar to constituting a pixel for a screen display using the TFT in AMLCD (Active Matrix LCD) or AMOLED. In other words, the touch cells that are described in the present invention detect touch inputs in an active matrix type. The technical advantages of the touch panel include excellent mass-production and good reliability, and prevention of a backflow of a signal to thus prevent touch inputs from being misrecognized and simultaneously to enable recognition of a multi-touch input that is touched at a number of touch points.

In order to detect a non-contact touch input in the embodiment of the present invention, a finger of a human body or a touch unit having a conductive characteristic similar to that of the finger should be maintained within a certain distance from the conductive pad for detecting a touch input. In order to maintain a certain distance between the touch unit and the conductive pad, a protective coating film may be formed on top of the conductive pad or a transparent substrate may be put thereon. Otherwise, if the conductive pad is provided on the bottom of the substrate, a distance between the touch unit and the conductive pad may be maintained by thickness of the substrate. Here, in the event that a touch input occurs by the touch unit, the touch unit is at a non-contact state relative to the conductive pad, but is at a contact state relative to the protective coating film or the transparent substrate. The terms "approach" and "contact" are understood as expressions referring to the touch input state of the touch unit.

In the accompanying drawings, thickness or areas have been enlarged to definitely show several layers and areas. When it is mentioned that a portion such as a layer, a film, an area and a substrate is placed "on" or "on the upper surface" of another portion, this means that the one portion is not only placed "justly on" the other portion but also a third portion is placed between the former and the latter. In contrary, when it is mentioned that a certain portion is placed "justly on" another portion, this means that there are no other portions between them. Meanwhile, the term "signal" that is used in the present invention represents a voltage or current unless otherwise specified.

Figure 2:
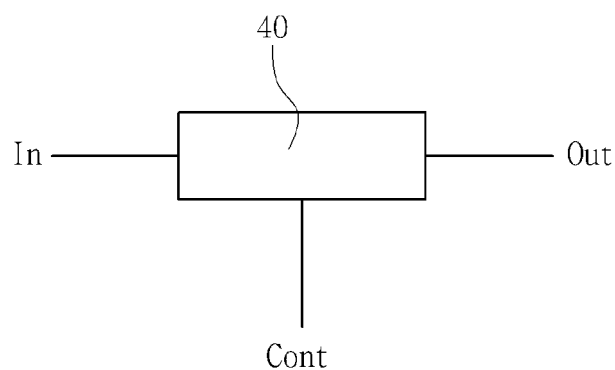
FIG. 2 is a configurational diagram showing a three-terminal type switching device.

FIG. 2 is a conceptual diagram showing a three-terminal type switching device constituting a touch cell. Referring to FIG. 2, the switching device 40 includes three terminals having a turn-on/off control terminal (indicated as "Cont" in FIG. 2), an input terminal (indicated as "In" in FIG. 2), and an output terminal (indicated as "Out" in FIG. 2). The turn-on/off control terminal is a control terminal for controlling turn-on/off of the switching device 40. If a predetermined magnitude of voltage or current is applied to the turn-on/off control terminal, voltage or current that is applied to the input terminal is output in the form of voltage or current via the output terminal.

Figure 3:
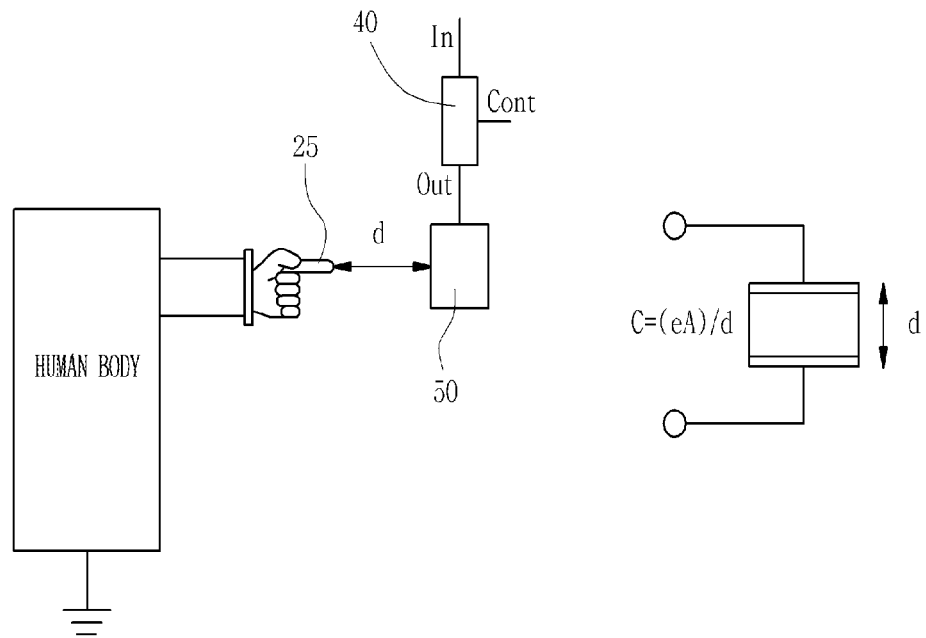
FIG. 3 is a conceptual view depicting a method of detecting a non-contact touch input in the present invention.

FIG. 3 is a conceptual view depicting a method of detecting a non-contact touch input in the present invention. As shown in FIG. 3, it is assumed that when a finger 25 or a conductive touch unit similar to the finger approaches to a conductive pad 50, a distance between the finger 25 and the conductive pad 50 is an interval "d" and an opposite area is "A." An electrostatic capacitance "C" is formed between the finger 25 and the conductive pad 50 as shown in a right-side equivalent circuit of FIG. 3 and a numerical formula. If a voltage or current signal is applied to the conductive pad 50 having the electrostatic capacitance "C," charges of a magnitude "Q" can be accumulated and a voltage relationship formula is formed as V=Q/C. In this case, the human body is virtually grounded with respect to the earth.

Figure 4:
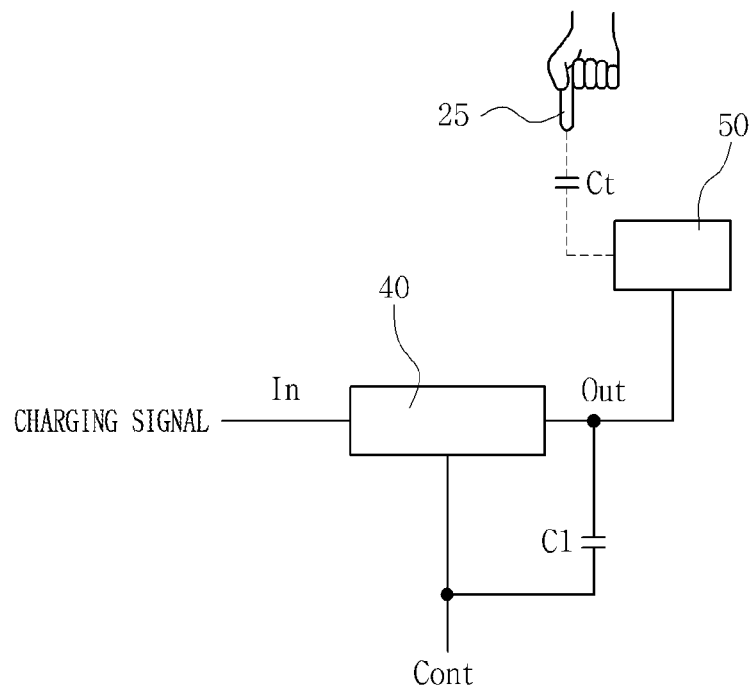
FIG. 4 is a circuit diagram showing a basic touch cell structure in accordance with an embodiment of the present invention.

FIG. 4 is a circuit diagram showing a basic touch cell structure in accordance with an embodiment of the present invention. Referring to FIG. 4, a unit touch cell constituting a touch panel includes: a conductive pad 50; a switching device 40 whose output terminal (or input terminal) is connected with the conductive pad 50, and to the input terminal (or output terminal) of which a charging signal is applied, and that is controlled to be turned on/off by a control signal; and a capacitor C1 that is connected between a control terminal of the switching device 40 and the conductive pad 50. The symbols Ct and C1 shown in FIG. 4 and a symbol C2 that will be described later with reference to FIG. 5 denote names and capacities of capacitors, respectively. For example, the symbol "C1" denotes a capacitor named as C1, and at the same time denotes a capacitance of C1 in size.

As shown, a charging signal is applied to the input terminal In of the switching device 40. Therefore, if a turn-on signal is applied to the control terminal Cont of the switching device 40, the charging signal is supplied to the conductive pad 50 through the switching device 40. Here, as shown in FIG. 4, if a bodily finger 25 approaches the conductive pad 50 at a predetermined interval, an electrostatic capacitance Ct is formed between the finger 25 and the conductive pad 50. The charging signal that has been supplied through the switching device 40 is stored in the capacitor Ct for a period of time, and is discharged through a discharge path that is formed by peripheral devices connected to the capacitor Ct rifer the period of time. The signal to be discharged will be gradually smaller in size according to lapse of time.

In the circuit diagram of FIG. 4, Ct means an electrostatic capacitance acting depending on whether or no a touch input occurs. In other words, when no touch inputs occur, Ct is not connected to the circuit. Only when a touch input occurs, Ct is connected to the circuit. Thus, when no touch inputs occur, Ct is not influenced by a kick back that is produced between the switching device 40 and the conductive pad 50 by a turn-on/off operation of the switching device 40. When a turn-on voltage that is applied to the control terminal Cont of the switching device 40 is "VH" and a turn-off voltage thereof is "VL," a difference in voltage according to the turn-on and turn-off of the control terminal Cont of the switching device 40 becomes a value that is obtained by subtracting the turn-off voltage "VL" from the turn-on voltage "VH." In addition, when a predetermined charging signal is applied to the input terminal In of the switching device 40, the switching device 40 is changed from a turn-on state to a turn-off state, and a voltage drop occurs between the switching device 40 and the conductive pad 50. In this case, as shown in the circuit diagram of FIG. 4, since the capacitor C1 is connected between the control terminal Cont of the switching device 40 and the output terminal Out thereof, a kick back voltage KB1 that is dropped in voltage between the switching device 40 and the conductive pad 50 can be defined as the following equation (1). Here, transient response characteristics due to wiring of signal lines, parasitic resistance, etc., are ignored.

$$KB1 = (VH - VL)\frac{C1}{C1} \qquad (1)$$

Meanwhile, if a touch input occurs as shown in the circuit diagram of FIG. 4, an electrostatic capacitance Ct is formed between the fingers 25 and the conductive pad 50. If Ct is produced as described above, a kick back becomes small between switching device 40 and the conductive pad 50, and the charging signal supplied through the switching device 40 is accumulated in the capacitor Ct for a predetermined time. Here, if a touch input occurs, a kick back voltage KB2 that is dropped in voltage between the switching device 40 and the conductive pad 50 by the turn-on/off operation of the switching device 40 can be defined as the following equation (2).

$$KB2 = (VH - VL)\frac{C1}{(C1 + Ct)} \qquad (2)$$

Here, the capacitance of C1 may be freely designed, and the capacitance of the capacitor Ct may be designed by adjusting an interval and an opposite area between a touch unit and the conductive pad 50. For example, if a large area of the conductive pad 50 is selected, the virtual Ct is also designed to have a large capacitance based on the equation of FIG. 3. Conversely, if a small area of the conductive pad 50 is selected (for example, 1 mm$^2$ or less), the capacitor Ct is designed to have a small capacitance. Preferably, the capacitor C1 is designed to be 10 fF to 300 uF in which fF is femto Faraday, and the capacitor Ct is designed to be several tens of fF to pF in which pF is pico Faraday. Thus, if Ct is designed to be larger than C1, KB2 can be designed to be much smaller than KB1. A touch input can be detected more easily by using a difference of the kick voltage values depending on whether or not the touch input occurs.

However, referring to the equation (1), it can be seen that KB1 has a large value corresponding to a voltage difference at the control terminal of the switching device 40. This means that the charging signal of a higher voltage level is required in order to compensate for KB1. If the charging signal is low, the output terminal of the switching device 40 is at a voltage that is dropped to a negative potential by the kick back. Accordingly, zero (0) voltage is applied to the input terminal of the switching device 40, to thus cause the signal to flow reversely. Therefore, KB1 need to be reduced more, and a solution of reducing KB1 is presented in a circuit diagram of FIG. 5.

Figure 5:
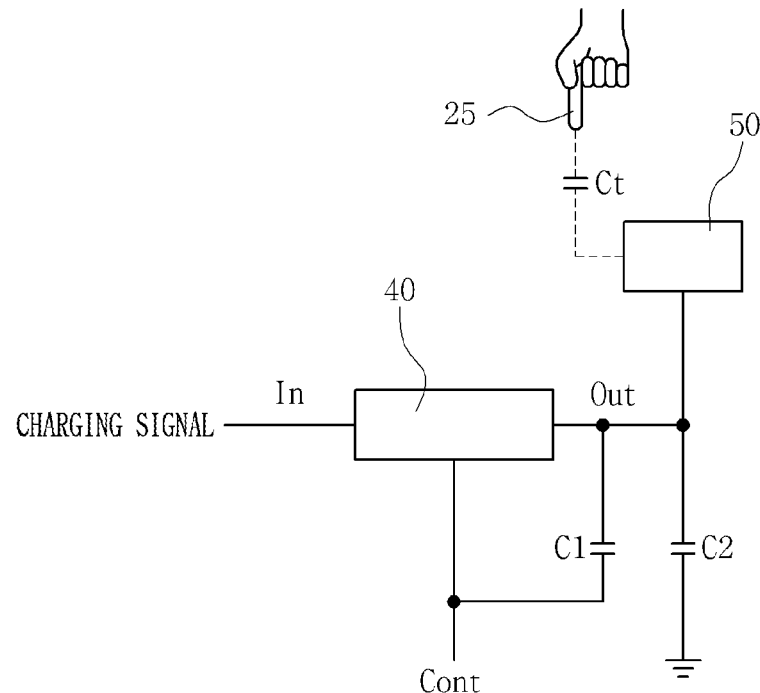
FIG. 5 is a circuit diagram showing a touch cell structure according to a preferred embodiment of the present invention.

FIG. 5 is a circuit diagram showing a touch cell structure according to a preferred embodiment of the present invention. As shown, an additional capacitor C2 is further provided between the conductive pad 50 and the ground. Accordingly, KB1 can be designed more stably by the additional capacitor C2. The kick back that occurs in the touch cell structure of FIG. 5 will be described as follows with reference to a waveform diagram shown in FIG. 6.

When the switching device 40 is turned on by applying a voltage of V1 in size to the input terminal In of the switching device 40 and a voltage of VH in size to the control terminal Cont thereof, at the time of occurrence of no touch inputs, a voltage measured at the output terminal Out of the switching device 40 is a voltage of V2. Here, transient response characteristics due to wiring of signal lines, parasitic resistance, etc., are ignored. When the switching device 40 is turned off by applying a voltage of VL in size to the control terminal Cont thereof after a predetermined time, a voltage measured at the output terminal Out of the switching device 40 is dropped in voltage. Here, since C1 is connected between the control terminal Cont of the switching device 40 and the output terminal Out thereof, and C2 is connected between the conductive pad 50 and the ground, as shown in the circuit diagram of FIG. 5, the kick back voltage KB1 of the Out-A waveform of FIG. 6 at the time of occurrence of no touch inputs can be defined as the following equation (3).

$$KB1 = (VH - VL)\frac{C1}{(C1 + C2)} \quad (3)$$

For example, in the case that VH is 10V, VL is −5V, V1 is 8V, and C1 and C2 are of an identical capacitance, the kickback voltage KB1 is 7.5V. In other words, V2 is lowered from 8V to 0.5V as shown in the Out-A waveform. In addition, this voltage drop means that an electric potential of the conductive pad 50 is lowered from 8V to 0.5V.

Figure 6:
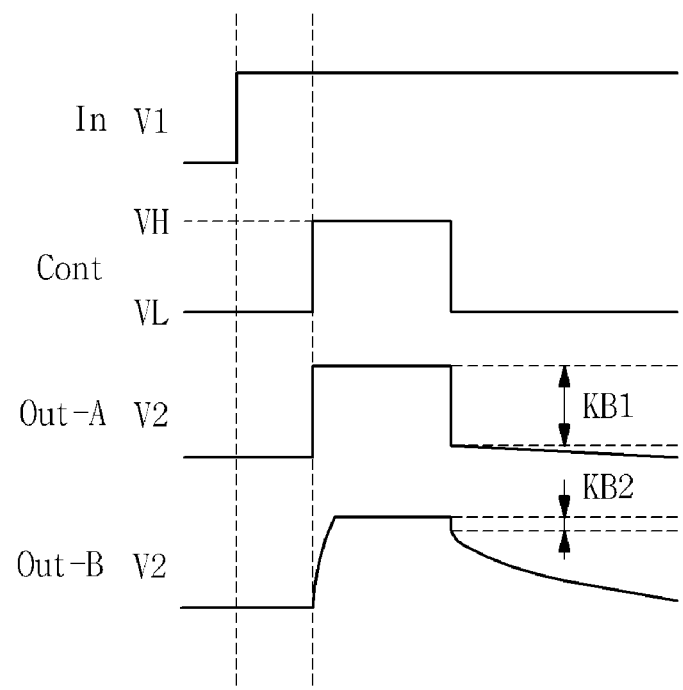
FIG. 6 is, a signal waveform diagram according to the touch cell structure of FIG. 5.

Meanwhile, the Out-B waveform of FIG. 6 is the waveform of the voltage measured at the output terminal Out of the switching device 40 in the case that a touch input occurs with respect to the conductive pad 50. The other conditions are the same as the above-described case, but in this case the electrostatic capacitance Ct is formed between the finger 25 and the conductive pad 50. Accordingly, the kick back voltage. KB2 of the Out-B waveform of FIG. 6 at the time of occurrence of a touch input can be defined as the following equation (4).

$$KB2 = (VH - VL)\frac{C1}{C1 + C2 + Ct} \quad (4)$$

If Ct has three times the size of C1, the kick back voltage KB2 is 3V. Namely, V2 drops in the waveform of Out-B from 8V to 5V. If an additional capacitor C2 is further added between the conductive pad 50 and the ground as shown in FIG. 5 as described above, the denominator in the equation that obtains the kick back voltage becomes large. Accordingly, the kick back voltage of the charging signal may be designed more easily, and Ct may be charged with a low charging voltage. In addition, the touch input can be detected easily by enlarging a difference between KB1 and KB2.

Figure 7:
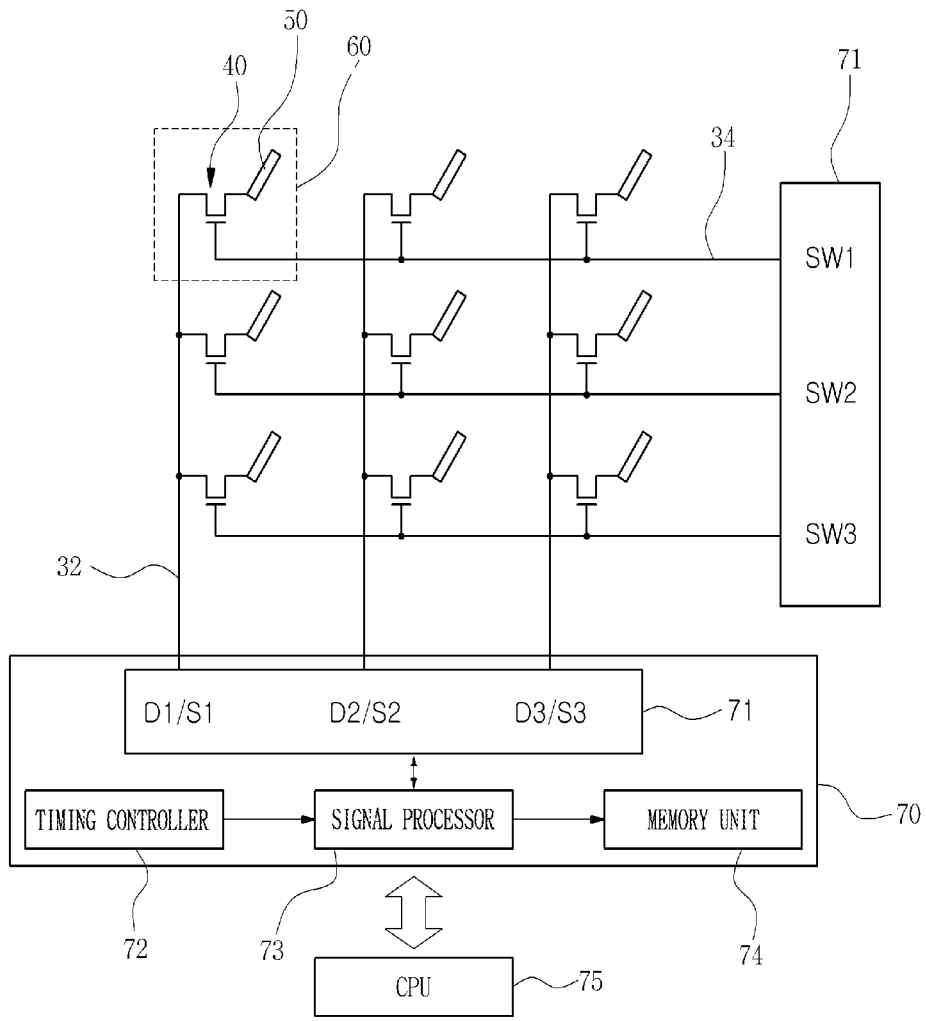
FIG. 7 is a configurational diagram showing a touch panel system according to the present invention.

FIG. 7 is a configurational diagram showing a touch panel system according to the present invention. As shown, a touch panel according to the present invention has a structure that a plurality of touch cells 60 having the same structure as those of FIGS. 4 and 5 are arranged in a matrix pattern, in a manner that a plurality of unit pixels are arranged in a matrix pattern in AMLCD or AMOLED. A plurality of signal lines are wired in the touch panel of the present invention. These signal lines are provided to apply a turn-on/off control signal to the control terminal of the switching device 40, apply a charging signal to the input terminal of the switching device 40, and simultaneously receive a position detection signal. In the FIG. 7 embodiment, an example of using a TFT as the switching device 40 is shown, in which identical reference numerals are given to the switching device 40 and the TFT.

Referring to FIG. 7, an array of the touch cells 60 is placed with a resolution of 3*3. Since the touch panel according to the present invention has high detection sensitivity and high accuracy, cell gaps between the touch cells 60 may be designed to be very small. Thus, the actual touch panel will be disposed with a higher resolution than the example of FIG. 7. However, to help understanding or the present invention, the example, that the touch cells 60 are arranged with a resolution of 3*3 has been illustrated. Thus, the touch cells 60 arranged with a resolution of 3*3 will be described below as an example.

Referring to FIG. 7, in the case of the touch panel according to the present invention, an active area that enables an actual touch operation on a single substrate 30 is divided into a plurality of sub-areas and each touch cell 60 is formed in each sub-area. A plurality of first signal lines 32 and a plurality of second signal lines 34 are arranged on the substrate 30 in order to apply signals to the respective touch cells 60 and to receive signals from the respective touch cells 60. The first signal lines 32 are provided to apply a gate signal to the TFT 40, and the second signal lines 34 are provided to apply a charging signal to the TFT 40 and receive a signal output from the TFT 40 by discharging of the conductive pad 50.

In the illustrated embodiment, the first signal lines 32 are wired in the vertical direction and the second signal lines 34 are wired in the horizontal direction. However, these signal lines have been illustrated only to help comprehension of this invention, but all the signal lines 32 and 34 may be wired at a different wiring angle. In addition, each signal line can be wired in the form of an oblique pattern or a zigzag pattern.

Each unit cell 60 includes a conductive pad 50 and a TFT 40. The conductive pad 50 is formed of Indium Tin Oxide (ITO), Carbon Nano Tube (CNT), Antimony Tin Oxide (ATO), Indium Zinc Oxide (IZO), or a transparent conductive material having a conductive characteristic similar to that of the ITO, CNT, ATO, or IZO. The conductive pad 50 forms an electrostatic capacitance in opposition to the bodily finger 25. The area of the conductive pad 50 functions as an important factor that determines an electrostatic capacitance that is generated at the time of occurrence of a touch input. For example, as the area of the conductive pad 50 becomes large within the touch cell 60, the electrostatic capacitance that is generated at the time of occurrence of a touch input becomes large.

Referring to a system configuration of FIG. 7, a touch position detector 70 is provided at a one-side edge portion of the panel or the outside of the panel. The touch position detector 70 includes a drive IC 71, a timing controller 72, a signal processor 73, and a memory unit 74. The detection signal obtained from the touch position detector 70 is transferred to a CPU 75. The CPU 75 may be a CPU for the display device 20, a main CPU of a computer device, or a CPU for the touch input device itself. Although it is not shown in the drawing, the system configuration further includes a power supply for generating a high or low voltage for the touch input detection.

The drive IC 71 is mounted at the edge portion of the substrate 30 in the form of a Chip On Film (COF) or a Chip On Glass (COG). In addition, the drive IC 71 may be configured into a System On Chip (SOC) in the form of an Amorphous Silicon Gate (ASG) that directly forms a gate on an amorphous silicon glass substrate. In addition, the drive IC 71 may be formed in the outside of the touch panel to thus transmit a signal for the substrate 30, by using a Flexible Printed Circuit (FPC).

The drive IC 71 applies a turn-on/off control signal of the TFT 40 via the second 34, applies a charging signal via the first signal line 32, and simultaneously receives a position detection signal from the first signal line 32. A method of transmitting and receiving a signal by using a single signal line as described above will be described below in detail with reference to a waveform diagram to be described later.

The timing controller 72 generates a time-division signal of tens of milliseconds (ms) or less. The signal processor 73 provides a scan pulse for the drive IC 71 according to a clock pulse supplied from the timing controller 72. Accordingly, the drive IC 71 applies a scan pulse to the respective second signal lines 34 sequentially, to thus control the respective TFTs 40 of the touch cells 60 to be turned on sequentially.

The memory unit 74 is a unit of temporarily storing the acquired coordinate values. The illustrated embodiment shows a case that the touch cell 60 has a resolution of 3*3. However, since the touch cell 60 has a much higher resolution actually, signals may be lost during processing of many signals. For example, when the signal processor 73 is in a "busy" state, it may not recognize the position detection signal to thus miss the signal. The memory unit 74 prevents the loss of signals as described above.

Figure 8:
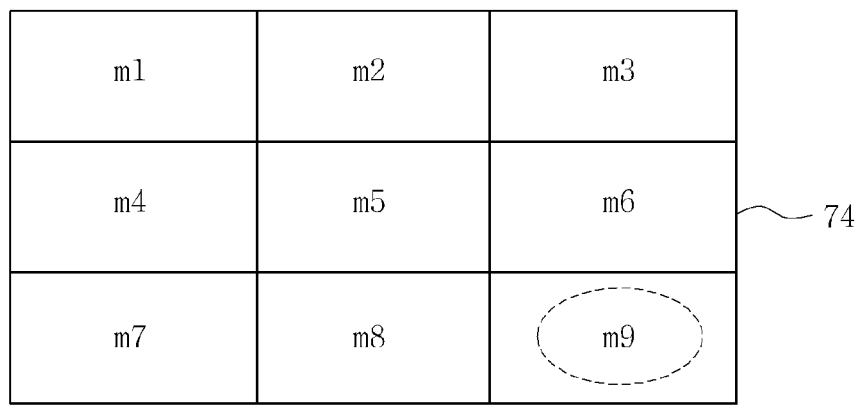
FIG. 8 is a block diagram showing an example of a memory unit according to an embodiment of the present invention.

FIG. 8 is a block diagram conceptually showing an embodiment of a memory unit. Referring to FIG. 8, the memory unit 74 has absolute addresses corresponding to the coordinates of the touch cells 60. To this end, the memory unit 74 has the number of bits greater than the number of the touch cells 60. If a touch input occurs at the right-lowest portion in the touch cells 60 of the embodiment of FIG. 7, the signal processor 73 stores the obtained coordinate in an "m9" address of the memory unit 74 as shown in a dotted line in FIG. 8, and reads the memory unit 74 after having scanned the whole signals once, to thus determine whether or not any missing signal or signals exist. If a signal corresponding to the coordinate in the m9 address has been missed, but has been stored in the m9address of the memory unit 74, the corresponding signal is generated as a normal input signal and erases the memory unit 74 prior to a next scanning operation.

Figure 9:
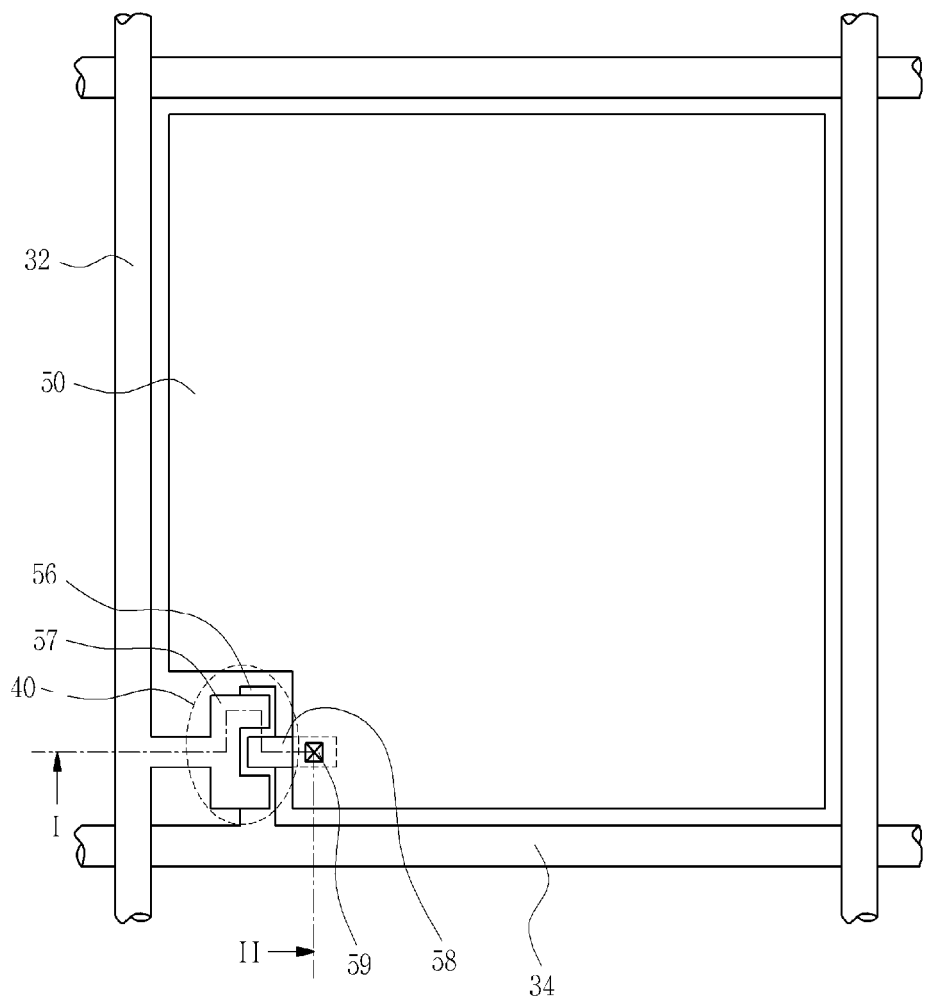
FIG. 9 is a plan view showing the touch cell according to the embodiment of FIG. 7.
Figure 10:
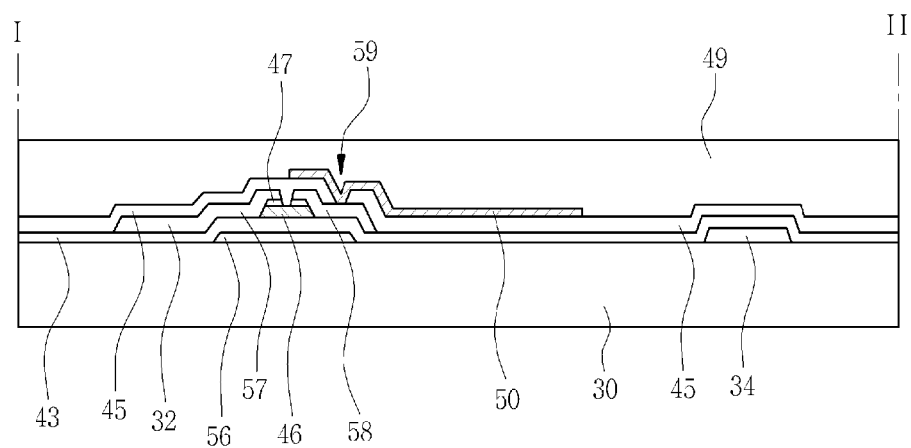
FIG. 10 is a cross-sectional view cut the touch cell according to the embodiment of FIG. 7.

FIG. 9 is a plan view showing a touch cell structure in the embodiment of FIG. 7, and FIG. 10 is a cross-sectional view cut along a line I-II of FIG. 9. As shown in FIG. 9, it can be seen that the conductive pad 50 occupies a significant area in the unit touch cell 60. Of course, this occupying area may be changed. Since the area of the conductive pad 50 is an important factor that determines the electrostatic capacitance Ct, it is desirable to design the area of the conductive pad 50 into an area suitable for detecting whether or not a touch input occurs.

Referring to FIG. 9, it can be seen that the TFT 40 is connected to the conductive pad 50 and the signal lines in the same manner as that of the FIG. 7 circuit diagram. As an embodiment, the signal lines are preferably formed of aluminum series metal such as aluminum and aluminum alloys, silver series metal such as silver and silver alloys, copper series metal such as copper and copper alloys, molybdenum series metal such as molybdenum and molybdenum alloys, chrome, titanium, and tantalum. A first signal line 32, a second signal line 34, and an auxiliary signal line 37 to be described later may include two films having respectively different physical properties, that is, a lower film (not shown) and an upper film (not shown) on the lower film. The upper film is made of metal of a low specific resistivity, for example, aluminum series metal such as aluminum and aluminum alloys, so as to reduce signal delay or voltage drop. In contrast, the lower film is made of a material having an excellent contact feature with respect to Indium Tin Oxide (ITO) and Indium Zinc Oxide (IZO), for example, molybdenum (Mo), molybdenum alloys, chromium (Cr), etc.

The signal lines are preferably formed of a transparent conductive material, and thus are prevented from being seen by observers. Although it is not shown in the drawings, when the signal lines are formed of the transparent conductive material, metal series signal lines may be used in part in order to insulate between the signal lines at the intersection of the signal lines and also reduce resistance of the signal lines. In addition, although it is not shown in the drawings, the signal lines may be protected with insulation films. If the signal lines are made of the transparent material, the signal lines may not be only prevented from being seen, but a moire phenomenon due to an optical interference with a black matrix (BM) that is formed between the signal lines (for example, such as a gate line and a source line of LCD) or pixels for screen display of the display device to thus conceal the signal lines may be also prevented. The signal lines that are formed in different kinds of layers are connected with other components via contact holes 59.

Referring to FIG. 10, a gate insulation film 43 made of silicon nitride (SiNx) is formed on the gate terminal 56 of the TFT 40. An active layer 46 is formed on top of the gate insulation film 43 in which the active layer 46 overlaps the gate terminal 56 and forms a channel between the drain terminal 57 and the source terminal 58. In addition, the active layer 46 is also formed to overlap the drain terminal 57 and the source terminal 58. The active layer 46 is formed of hydrogenated amorphous silicon or polycrystalline silicon. An ohmic contact layer 47 made of a material of $n^+$ hydrogenated amorphous silicon in which high concentrations of silicide or n-type impurities are doped is formed on the active layer 46. The ohmic contact layer 47 is a layer for ohmic contact between the drain terminal 57 and the source terminal 58. A protective film 45 is formed on the drain terminal 57 and the source terminal 58, respectively. A conductive pad 50 that is formed of a transparent conductive material such as ITO is located on the upper surface of the protective film 45.

As shown, in order to connect the conductive pad 50 to the source terminal 58 of the TFT 40, the contact holes 59 are used. The contact holes 59 can be made into different shapes such as a polygon or circle.

Referring to FIG. 10, it can be seen that touch components such as the conductive pad 50 and the TFT 40 are mounted on the upper surface of the substrate 30. In the case that the conductive pad 50 is mounted on the upper surface of the substrate 30, a transparent insulating film 49 can be used for the purpose of protecting the conductive pad 50 and for the purpose of maintaining a gap between the finger 25 and the conductive pad 50 stably. As shown, the upper surface of the transparent insulating film 49 is designed to be flat, and is made of a transparent insulating material. If the touch components including the conductive pad 50 are positioned on the lower surface of the substrate 30, the transparent insulating film 49 may be removed.

Although it is not shown in the drawings, light shield layers for blocking light can be formed on the TFT 40. The material that is used to manufacture the drain terminal 57 and the source terminal 53 of the TFT 40 or the material that is used to manufacture the gate terminal 56 can be used as the light shield layers. The light shield layers prevent the TFT 40 from malfunctioning in response to light.

Figure 11:
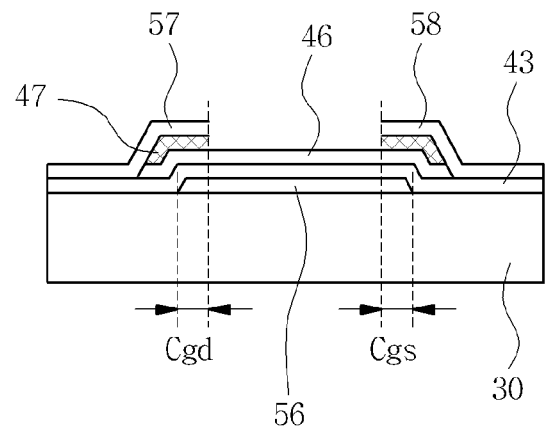
FIG. 11 is a cross-sectional view showing an example of capacitors that are built in a TFT.

FIG. 11 is a cross-sectional view of a TFT and shows an example that capacitors are internally built in the TFT. Referring to FIG. 11, capacitors Cgd and Cgs are formed between the gate terminal 56 and the other terminals of the TFT, respectively, since the gate insulation film 43 exists between the gate terminal 56 and the other terminals of the TFT, respectively. As shown, the capacitor Cgd is formed in an area where the drain terminal 57 overlaps the gate terminal 56, and the capacitor Cgs is formed in an area where the source terminal 58 overlaps the gate terminal 56. These capacitors Cgd and Cgs are manufactured during a manufacturing process of the TFT. The capacities of the capacitors Cgd and Cgs may be changed determined depending upon with or length of the TFT. For example, the capacitors Cgd and Cgs are designed to 10 fF (femto F) to 300 fF or so depending upon width or length of the TFT.

Figure 12:
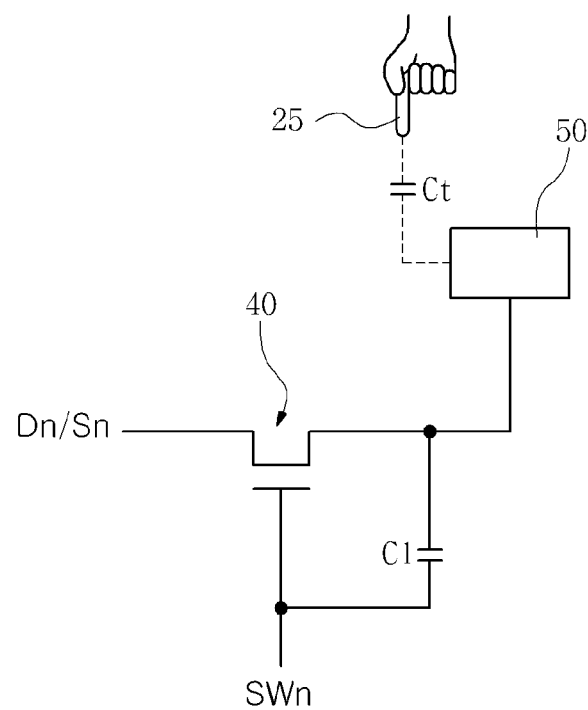
FIG. 12 is a circuit diagram showing structure of the touch cell according to the embodiment of FIG. 7.

As described above, when a capacitor is built in during a manufacturing process of the TFT, each touch cell has the same circuit configuration as that of FIG. 12 in the FIG. 7 embodiment. In other words, when a TFT is selected as the switching device 40 in the touch cell structure according to the present invention, the same circuit configuration as that of that of FIG. 4 is obtained without adding a separate capacitor between the gate terminal of the TFT 40 and the source terminal thereof. The above-described kick back effect can be obtained by the capacitor Cgs that is built in between the gate terminal of the TFT 40 and the source terminal thereof. As described above, the touch cell structure according to the present invention can be configured so that the capacitor C1 is provided at the outside of the switching device 40 or the capacitor C1 is built in the switching device 40. In addition, in some cases, a capacitor may be built in the switching device 40 using a TFT and an additional capacitor may be also connected to an external terminal of the TFT simultaneously.

Figure 13:
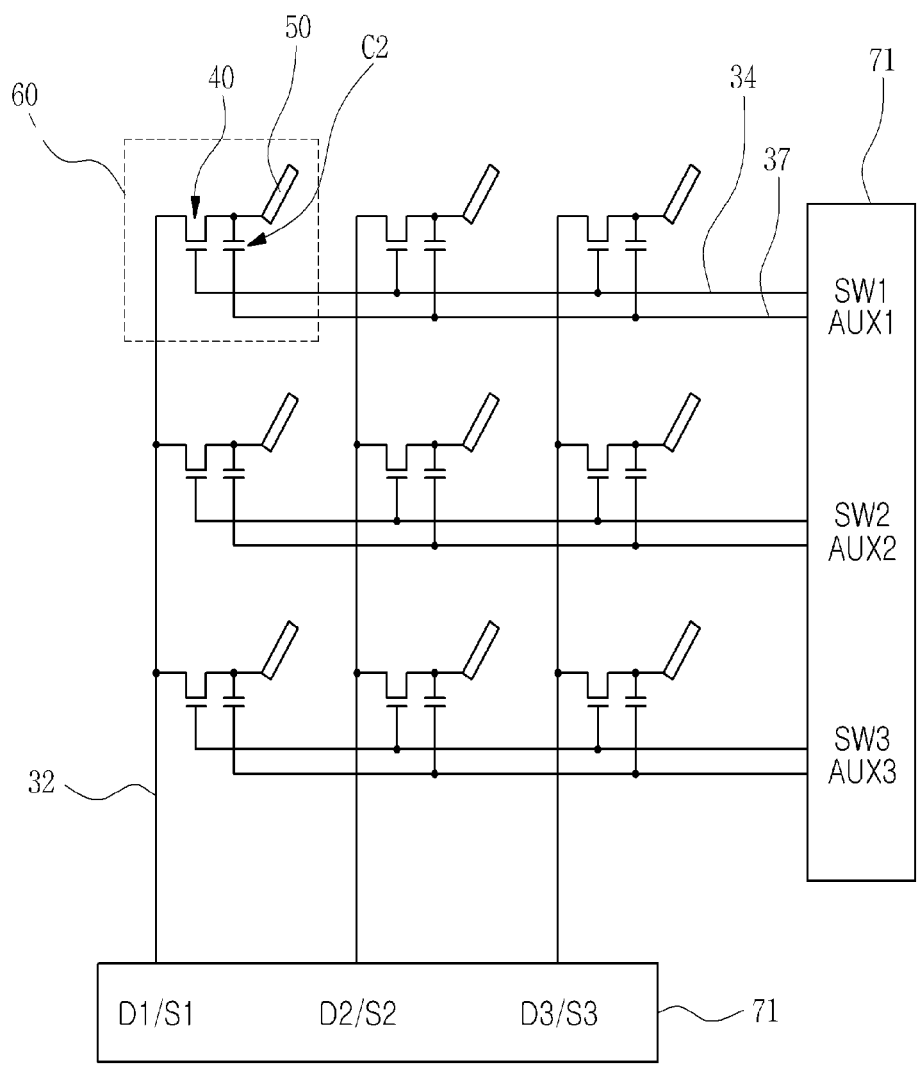
FIG. 13 is a configurational diagram showing a touch panel according to another embodiment of the present invention.

FIG. 13 is a configurational diagram showing a touch panel according to another embodiment of the present invention. Referring to FIG. 13, a TFT 40 is provided as a switching device 40 in each touch cell 60. In addition to the embodiment of FIG. 7, an additional capacitor C2 is further connected between a conductive pad 50 and the ground. As noted earlier, since a capacitor C1 is built in the TFT 40 and the additional capacitor C2 is further provided in addition to the capacitor C1, each touch cell 60 of FIG. 13 has the same circuit configuration as that of FIG. 5. Thus, as described with reference to FIG. 5, the embodiment of FIG. 13 can control a kick back voltage more reliably. In addition, when the additional capacitor C2 is provided as described above, a charging time and a discharging time can be longer in the touch cell 60 where a touch operation has occurred, to thus detect the touch input more reliably.

Referring to FIG. 13, differently from FIG. 5, one end of the additional capacitor C2 is connected to an auxiliary signal line 37. The auxiliary signal line 37 is provided to make one end of the additional capacitor C2 become at zero (0) potential reliably. As an example, a signal AUX1, AUX2 or AUX3 that is applied to the auxiliary signal line 37 has the ground potential (zero V). In other words, connection of one end of the additional capacitor C2 to the auxiliary signal line 37 has the substantially same concept as connected of one end of the additional capacitor C2 to the ground.

Figure 14:
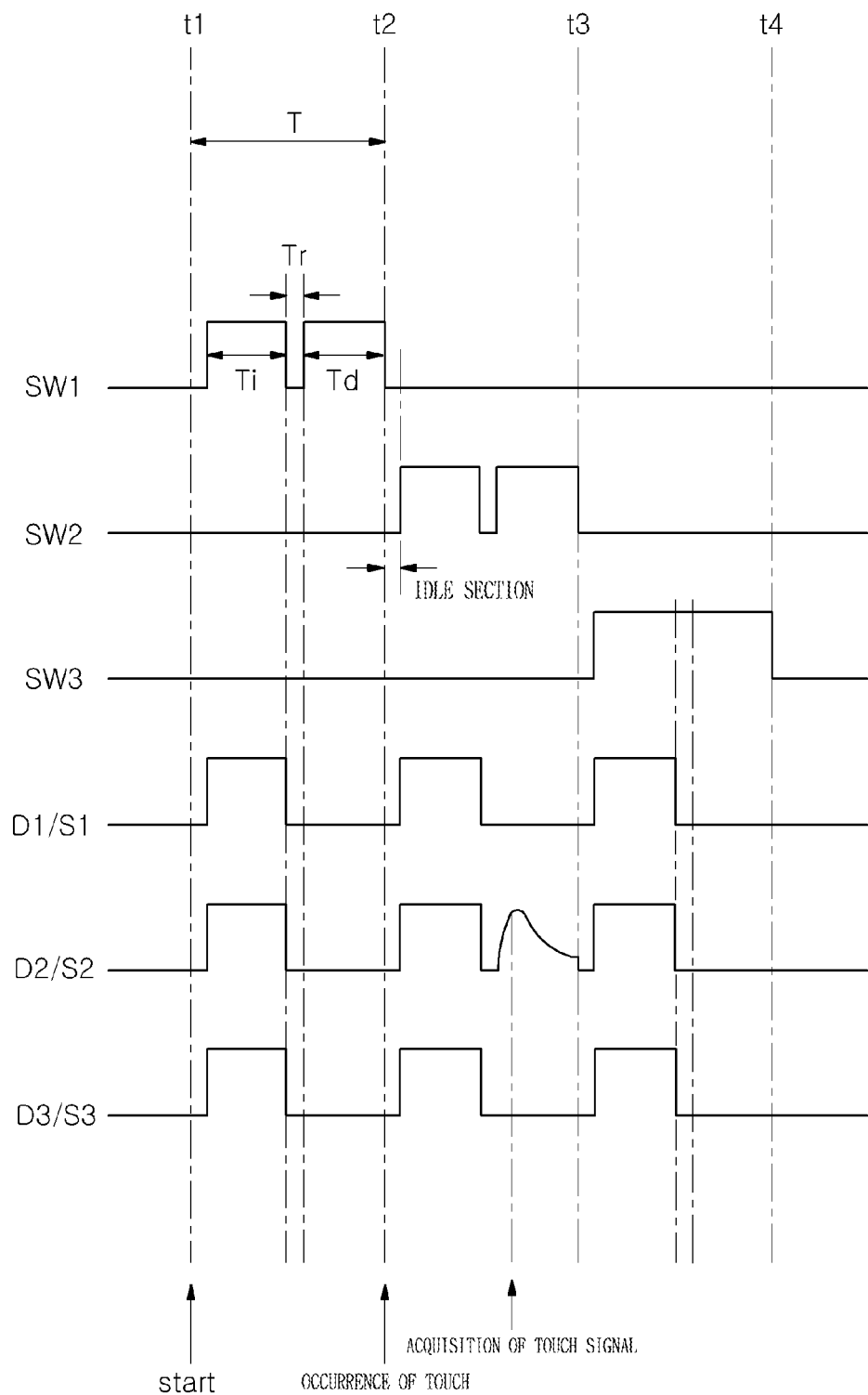
FIG. 14 is a waveform diagram showing an example of detecting a touch input.

FIG. 14 is a waveform diagram showing an example of detecting a touch input according to the present invention.

Referring to FIG. 14, a touch input detection method according to the present invention will follow.

In the embodiment of FIG. 7 or 13, a low voltage that is applied to the second signal line 34 by the drive IC 71 is an enough voltage to turn off the TFT 40. As an example, −5V to −10V is used as the turn-off voltage of the TFT 40. A high voltage that is applied to the second signal line 34 by the drive IC 71 is an enough voltage to turn on the TFT 40. As an example, 10V to 18V is used as the turn-on voltage of the TFT 40.

Referring to the waveform diagram of FIG. 14, the drive IC 71 applies a scan signal to each second signal line 34 at a period of T. As shown, an idle section exists preferably between the scan signals. A one-cycle of the scan signal includes a position detection signal input section Ti to enter position detection signals D1 to D3 and a position detection signal detection section Td to detect output position detection signals S1 to S3. A reset signal section Tr is included between the position detection signal input section Ti and the position detection signal detection section Td. As shown in the SW3 waveform of FIG. 14, the reset signal section Tr may not be included therebetween. However, in this case, it is desirable that the position detection signals D1 to D3 and the output position detection signals S1 to S3 are synchronous with each other in the position detection signal input section Ti and the position detection signal detection section Td, respectively.

As shown, when the high voltage is applied to the second signal line 34 in the input position detection signal interval Ti, the TFTs 40 connected to the second signal line 34 are at the turn-on state. In addition, the input position detection signals D1 to D3 synchronized with the gate signals SW1 to SW3 in the position detection signal input section Ti is applied through the first signal line 32. For example, the input position detection signals D1 to D3 are 8V, respectively. When the low voltage is applied to the second signal line 34 in the reset signal section Tr after having applied the input position detection signals D1 to D3, the TFTs 40 connected to the second signal line 34 are changed to the turn-off state from the turn-on state. A reset signal is also applied through the first signal line 32. The reset signal applied through the first signal line 32 is provided to make the potential of the first signal line 32 become at a particular potential before detecting the output position detection signals S1 to S3. In this embodiment, voltage of zero (0) V is applied to make the first signal line 32 become at zero (0) V.

As shown, the high voltage is again applied to the second signal line 34 in the input position detection signal interval Ti, as described above. In addition, the touch position detector 70 receives the output position detection signals S1 to S3 synchronized with the gate signals SW1 to SW3 in the position detection signal detection section Td from the first signal line 32. If no output position detection signals S1 to S3 have been received in the position detection signal detection section Td, the output position detection signals S1 to S3 are at a low state, which means that no touch operations have occurred.

Here, the charging signal applied at a state where no touch inputs occur in the position detection signal input section Ti is dropped in voltage with a big difference by the kick back voltage KB1 as described previously. In the FIG. 13 embodiment, the minute signal may be charged in the capacitor C2 and then discharged in the position detection signal detection section Td. However, since the charging signal is dropped in voltage with a big difference by the kick back voltage KB1, the signal that has been charged in and then discharged from the capacitor C2 is not restored into the first signal line 32 or is a very small level signal which is negligible.

If the input position detection signal D2 is applied at a state where the finger 25 or the touch unit such as a conductive object approaches the central touch cell 60 in the touch panel of FIG. 7 or 13, the electrostatic capacitance Ct is formed between the touch unit and the conductive pad 50, and the charging voltage of 8V is dropped down to 5V by the kick back voltage KB2 to then be accumulated in the capacitor Ct as described previously. Then, since the TFT 40 is maintained to be at a turn-off state in the reset signal section Tr, the voltage formed in the conductive pad 50 is maintained at 5V during the reset. The potential of the first signal line 32 in the reset signal section Tr becomes at zero (0) V by the low reset signal applied to the first signal line 32. Meanwhile, if the TFT 40 is turned on in the position detection signal detection section Td, the voltage of 5V formed in the conductive pad 50 is discharged through the first signal line 32 and an output position detection signal S2 is received from the first signal line 32. Accordingly, the touch position detector 70 acquires a touch signal corresponding to the gate signal SW2 and the output position detection signal S2. In other words, if the S2 signal is obtained when the SW2 gate signal is generated. S2, if the signal acquisition, this means that a touch operation occurs at a coordinate (SW2, S2).

In the FIG. 14 waveform diagram, the transient response characteristics of signals and a unique charge-discharge waveform have been ignored. In this embodiment, the output position detection signals S1 to S3 have been indicated to be at a high state, respectively, when a touch input has occurred, but may be changed to be at a low state according to a configuration of a detection circuit. The other signals may be also changed to be at a high state or a low state according to a configuration of the detection circuit.

In addition, the above-mentioned embodiment has been described with respect to the TFTs that are of a voltage driving type, but driving and detection methods may vary in the case that the TFTs are replaced by the other switching devices. For example, switching devices such as BJTs or IGBTs operate at a current-driven mode, and output tens of times or more current in comparison with the current applied to the control terminal. Therefore, the switching devices such as BJTs or IGBTs are given a kick back difference depending on whether or not a touch input occurs, respectively, and thus obtain an output current characteristic exhibiting tens of times or more a difference in comparison with a control current of a small difference.

Meanwhile, the position detection signal input section Ti of the scanned gate signal, the reset signal section Tr, the position detection signal detection section Td, the idle time, and timing (not shown) for delaying the input position detection signals D1 to D3 in comparison with the scan signal and applying the delayed input position detection signals D1 to D3 are variable depending on the state of the touch panel. Therefore, it is necessary to have components that determine these variables.

Figures 15, 16:
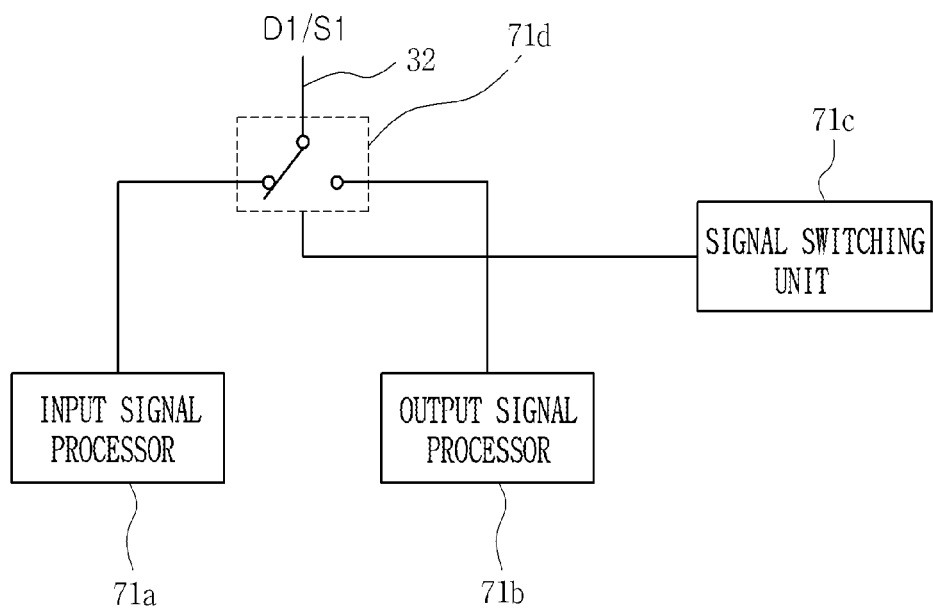
FIG. 15 shows configurational tables showing examples of determining a signal section and a delay time between signals, respectively.
FIG. 16 is a block diagram conceptually showing an example of a signal switching unit.

FIG. 15 shows exemplary tables showing a unit for determining a signal section and a delay time between signals, in which registers are used. Referring to FIG. 15, R10 denotes an address of the register, indicating that it is positioned at the ten (10)-address of the register addresses. Input0 to Input3 are bits that determine the width of the position detection signal input section Ti, and RST0 to RST3 are bits that determine the width of the reset signal section Tr. In the FIG. 15 embodiment, since the state of Input0 to Input3 is "1100," that is, "HHLL," the applied timing of the input position detection signals D1-D3 corresponding to the Input0 to Input3 will be 130 us in the lower table of FIG. 15. Although the example of the position detection signal input section Ti has been shown in FIG. 15, a method of determining a signal section by using registers as described above may be used to determine the reset signal section Tr, position detection signal detection section Td, the idle section, and the delay time of the gate signal and the input position detection signals D1 to D3. In addition, although it is not shown in the drawing, the signal section and the delay between signals may be determined by the amount of voltage or current applied to the touch detection unit 70.

Meanwhile, the touch input device according to the present invention transmits and receives the position detection signal through the first signal lines 32, and thus has an advantage of reducing wires of the signal lines. However, the touch position detector 70 need to have a unit for separately processing the input position detection signals D1 to D3 and the output position detection signals S1 to S3.

FIG. 16 is a block diagram conceptually snowing an example that a touch position detector transmits and receives a position detection signal through a single data signal line by using a signal switching unit. As shown, a drive IC 71 includes an input signal processor 71a, an output signal processor 71b, and a signal switching unit 71c. In addition, a switching unit 71d for selectively connecting a first signal line 32 to the input signal processor 71a or the output signal processor 71b is provided at the end of the first signal line 32. The drive IC 71 controls the signal switching unit 71c to thus connect the first signal line 32 with the input signal processor 71a in the position detection signal input section Ti of the gate signal, and connect the first signal line 32 with the output signal processor 71b in the position detection signal detection section Td. The input signal processor 71a, the output signal processor 71b, and the signal switching unit 71c may be implemented into physical circuit configuration, but may be implemented by software configuration.

In the case of the touch input detection method according to the present invention, touch inputs can be detected by observation of the waveform in the FIG. 14 waveform diagram, in particular, it can be detected digitally whether or not a touch input occurs. The touch input detection method of detecting a touch input includes the steps of: (a) detecting a signal output from an output terminal of a switching device 40 according to a kick back that occurs between the switching device 40 and a conductive pad 50 when no touch inputs occur; (b) detecting a signal output from the output terminal of the switching device 40 according to a kick back that occurs between the switching device 40 and the conductive pad 50 when any touch inputs occur; and (c) recognizing a touch input from the signal detected in the step (b) by comparing the signal detected in the step (a) with the signal detected in the step (b).

Such a touch input detection is due to a specialized touch cell structure according to the present invention. As mentioned earlier, a kick back difference occurs depending upon whether or not a touch input occurs, and the kick back difference determines the potential of the conductive pad 50. In addition, the signal that is input to the first signal line 32 has a big difference depending on whether or not a touch input exists. Here, detection of the touch input digitally according to the present invention means that it can be judged whether or not a touch input exists only with the pitch of the signal.

Figure 17:
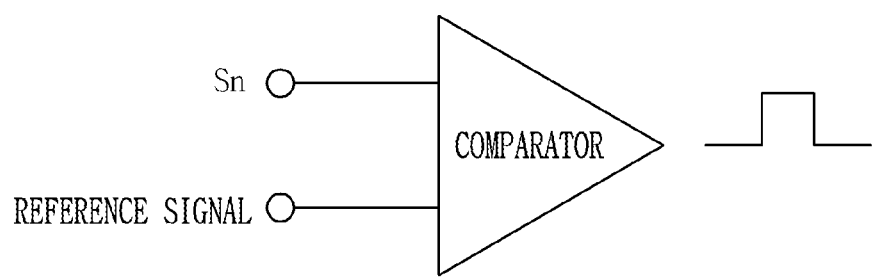
FIG. 17 is a diagram illustrating an example of detecting a touch input by using a comparator.
Figure 18:
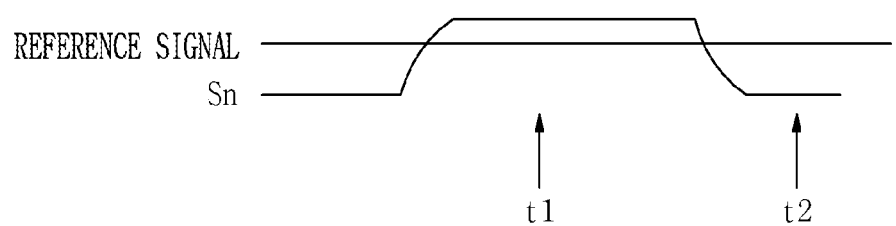
FIG. 18 is waveform diagram showing waveform at the time of detection by the comparator of FIG. 7.

FIG. 17 is a schematic diagram illustrating an example of detecting a touch input by using a comparator according to the present invention, and FIG. 18 is waveform diagram showing an operational principle of the comparator of FIG. 7. As shown in FIG. 17, a signal Sn that is input to the first signal line 32 is input to the comparator and is compared with a reference signal. As noted earlier, since a difference of the signal input to the first signal line 32 becomes large depending on whether or not a touch input occurs, the comparator can obtain a comparison result very easily. In addition, the output of the comparator is a digital signal having a high or low level. Thus, the touch position detector 70 can read the digital signal without additional signal conversion.

For example, as shown in FIG. 18, when a touch input occurs and the signal Sn becomes high at an interval of t1, Sn gets greater than the reference signal and the output of the comparator becomes high or low depending on configuration of the circuit. Sn drops to a low level, at an interval of t2 where a touch input is interrupted or a signal will be extinguished after a specified time interval. In this case, Sn is smaller than the reference signal, and the output of the comparator becomes high or low depending on configuration of the circuit. Thus, the touch position detector 70 can process the output of the comparator digitally.

Since the touch cell structures according to the above-mentioned embodiments of the present invention have been described with respect to nothing but several embodiments of the present invention, each touch cell structure further includes additional switching devices, capacitors or other electrical devices such as resistors, in addition to the basic structures of the above-described embodiments.

The invention has been described with respect to the preferred embodiments. However, the invention is not limited to the above embodiments, and it is possible for one who has an ordinary skill in the art to make various substitutions, modifications and variations without departing off the spirit of the invention defined by the claims.

The invention claimed is:

1. A touch cell structure constituting a unit touch cell in a touch panel, the touch cell structure comprising:
a conductive pad that forms an electrostatic capacitance with respect to a touch unit when a finger of a human body or the touch unit having an electrical characteristic similar to the finger approaches the conductive pad within a predetermined distance;
a three-terminal type switching device whose input and output terminals are connected with the conductive pad and that is controlled to be turned on/off by a control signal that is applied to a gate terminal of the three-terminal type switching device, to thus charge or discharge the electrostatic capacitance formed between the touch unit and the conductive pad; and
a capacitor C1 that is connected between the control terminal of the switching device and the conductive pad.

2. The touch cell structure according to claim 1, further comprising a capacitor C2 that is connected between the conductive pad and the ground.

3. The touch cell structure according to claim 2, wherein the capacitors C1 and C2 are in the range of 10 fF to 300 uF, respectively.

4. The touch cell structure according to claim 2, wherein the capacitors C1 and C2 are selected to have a smaller value by twice to several hundreds of times than the electrostatic capacitance formed between the touch unit and the conductive pad.

5. The touch cell structure according to claim 1, wherein the switching device is any one selected from the group consisting of a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch.

6. The touch cell structure according to claim wherein the capacitor C1 is built in the switching device.

7. The touch cell structure according to claim 1, wherein the capacitor C1 is provided in the outside of the switching device.

8. The touch cell structure according to claim 1, wherein the capacitor C1 is built in the switching device, and simultaneously another capacitor C1 is provided in the outside of the switching device.

9. A touch panel comprising:
a light transmissive substrate;
a plurality of touch cells that are arranged in a matrix form on the light transmissive substrate, in which each touch cell comprises a conductive pad and a three-terminal type switching device; and
a touch position detector that is provided at an edge portion of the substrate or at an outside of the substrate, to thus apply a turn on/off control signal to a control terminal of the switching device, apply a charging signal to the conductive pad, and recognize a touch input considering a difference between output signals of the switching device due to a kick back difference depending upon whether or not the touch input occurs,
wherein the kick back difference is determined by the voltage difference at least one out of a capacitor C1 that is connected between the control terminal of the switching device and the conductive pad, a capacitor C2 that is connected between the conductive pad and the ground and an electrostatic capacitance(Ct) formed between the touch unit and the conductive pad between when the touch input occurs and when the touch input doesn't occur.

10. The touch panel according to claim 9, further comprising a comparator for comparing the output signal of the switching device and a reference signal.

11. The touch panel according to claim 10, wherein the reference signal corresponds to an intermediate value between the output signals from the switching device at the time of occurrence of no touch inputs and at the time of occurrence of any touch inputs.

12. The touch panel according to claim 9, wherein the touch position detector further comprises a memory unit having addresses corresponding to the coordinates of the touch cells, in which if a touch input is detected from the output signal of the switching device, coordinate values of the corresponding touch cell are stored in the corresponding addresses of the memory unit.

13. A touch input detection method of detecting a touch input by using a touch cell structure, the touch input detection method comprising the steps of:
(a) detecting a signal output from an output terminal of switching device according to a kick back that occurs between the switching device and a conductive pad when no touch inputs occur;
(b) detecting a signal output from the output terminal of the switching device according to a kick back that occurs between the switching device and the conductive pad when any touch inputs occur; and
(c) recognizing a touch input from the signal detected in step (b) by comparing the signal detected in step (a) with the signal detected in step (b),
wherein the kick back difference is determined by the voltage difference at least one out of a capacitor C1 that is connected between the control terminal of the switching device and the conductive pad, a capacitor C2 that is connected between the conductive pad and the ground and an electrostatic capacitance(Ct) formed between the touch unit and the conductive pad between when the touch input occurs and when the touch input doesn't occur.

14. The touch input detection method of claim 13, wherein an intermediate value between the signal detected in the step (a) and the signal detected in the step (b) is set as a reference signal in the step (c), to then recognize the touch input if the signal output from the output terminal of the switching device exceeds the reference signal.

* * * * *